3,262,749
HIGH SPEED CAMERA
Francis H. Nadig, Philadelphia, and Jacob L. Bohn, Glenside, Pa., and Theodore Korneff, Burlington, N.J., assignors to Temple University, Philadelphia, Pa., a non-profit charitable corporation of Pennsylvania
Filed Oct. 22, 1963, Ser. No. 317,967
7 Claims. (Cl. 352—106)

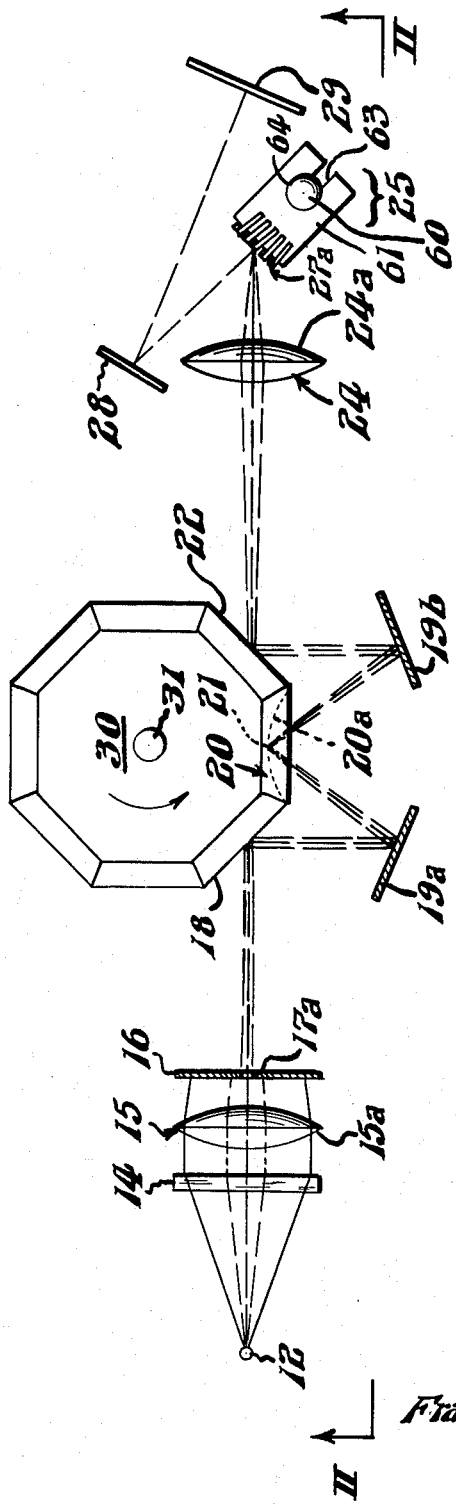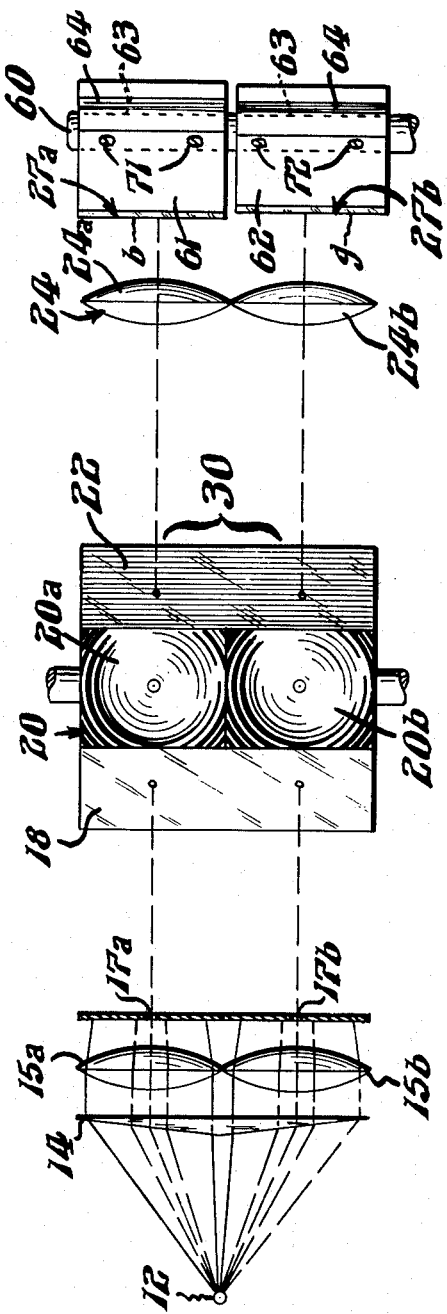

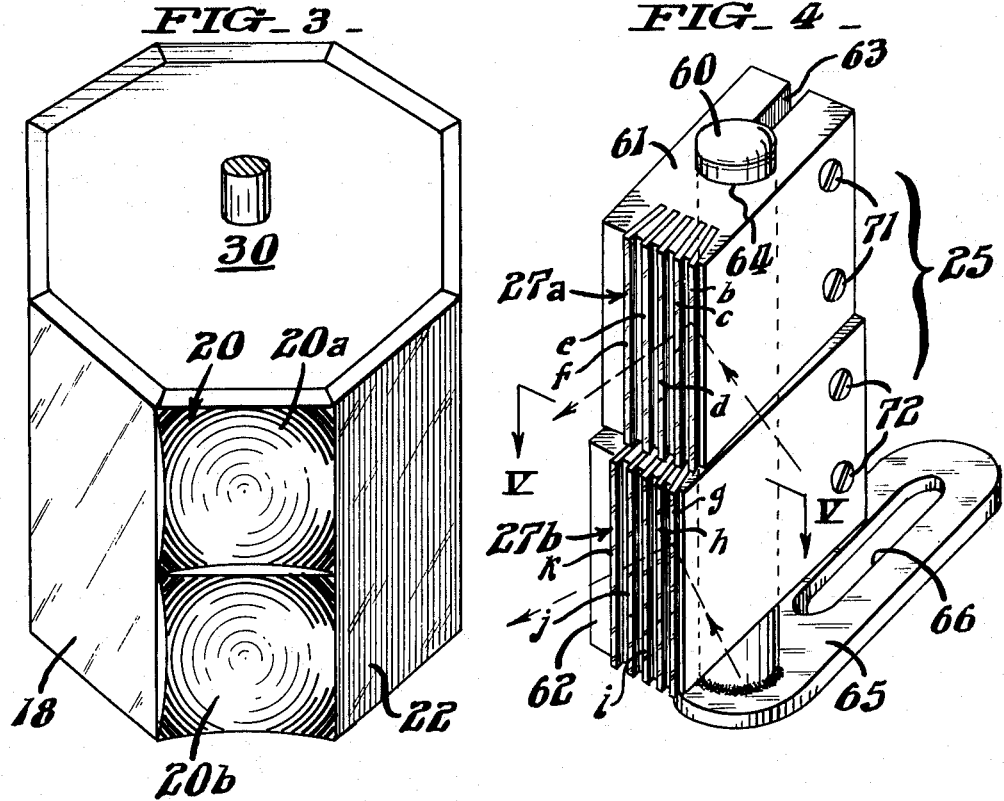
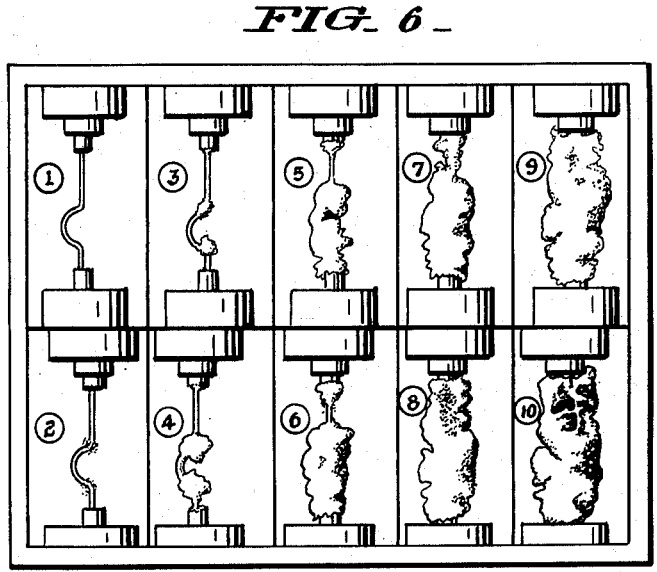
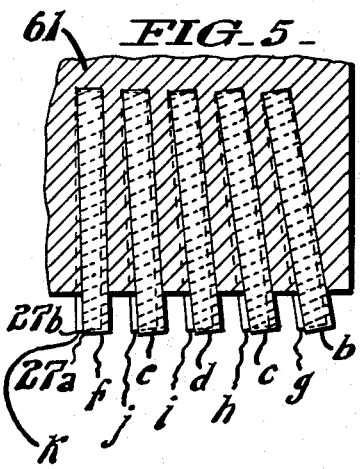
INVENTORS.
Francis H. Nadig, Jacob L. Bohn
& Theodore Korneff,
BY Paul & Paul
ATTORNEYS.

This invention relates to high-speed photography, and is more particularly concerned with a high speed camera for producing a series of photographic images of rapidly occurring phenomena such as explosions and the like.

Photography of a high-speed phenomena in the past has presented problems. It has been difficult to obtain extremely fast photographs of high-speed phenomena while preserving clarity of detail. In order to obtain the requisite detail and to prevent a time smear photograph it is desirable that there be exposure times of less than one microsecond and there be a substantial comparative time lapse between any two pictures of the group.

Previous efforts in the field of high-speed photography have related to improving the intensity of the beam which eventually records on film the image of the phenomena being photographed, and the prevention of what is known as a time smear photograph. Korneff et al. Patent No. 3,029,685 issued April 17, 1962, provided for an increase in the number of images capable of being photographed in a given time interval. The high speed camera of Nadig et al. Patent No. 2,961,918 issued November 29, 1960, utilized an image multiplier combined with an aperture placed ahead of a lens which focused the image to be photographed upon a suitable film. These efforts while successful were limited in speed and provided only five successive pictures of the phenomena being photographed. It has long been desirable to obtain even faster pictures than the Nadig and the Korneff devices are capable of producing. It has also been desirable to obtain a greater number of pictures during an even shorter period to obtain a more detailed record of high-speed phenomena such as flame propagations, exploding wires or any other activity of extremely short duration.

It is accordingly an object of this invention to provide an improved means for multiplying images in a high speed camera so as to prevent a time smear photograph.

It is also an object of this invention to provide an improved rotating mirror surface for a high speed camera that is able to provide greater light intensity in the recorded images thereby providing better picture quality.

The above and still other objects, advantages and features of this invention will become more readily apparent from consideration of the following detailed description and accompanying drawings.

FIG. 1 is a schematic illustration of one specific form of this invention comprising a basic rotating mirror system in combination with an image multiplier grid.

FIG. 2 is a schematic illustration taken as indicated by the lines and arrows II—II in FIG. 1, with certain parts removed for clarity of illustration.

FIG. 3 is a perspective view of the construction of the rotating mirror shown in FIGS. 1 and 2.

FIG. 4 is a perspective view of the image multiplier grid shown in FIGS. 1 and 2.

FIG. 5 is a detailed cross-sectional view taken as indicated by the lines and arrows V—V in FIG. 4, showing the image multiplier grid detail.

FIG. 6 is a pictorial representation of a typical sequence of exposures obtained according to this invention.

Referring now to the specific form of the invention selected for illustration in FIG. 1, reference character 12 designates a point in an object to be photographed. A beam splitting prism 14 is located at a predetermined distance from point 12. The character 15 designates a lens system having an upper and lower lenses 15a and 15b spaced equally from prism 14. Slit plate 16 located at a predetermined distance from lens system 15 contains aperture slits 17a and 17b aligned with the images resulting from lenses 15a and 15b.

Mirror surface 18 is attached to rotating mirror 30 and is optically aligned with the aperture slits 17a and 17b. The multi-faced mirror 30 is an octagonal polygon that rotates about an axis 31. Stationary flat mirror 19a is in optical alignment with mirror surface 18, and with spherical mirror 20 located on rotating mirror 30. Reference character 21 designates the point of convergence of the light beam as it travels through the apparatus. Stationary mirror 19b is located in a predetermined optical alignment with spherical mirror 20 and flat reflecting mirror surface 22. Lens system 24 containing lenses 24a and 24b are positioned in alignment with flat reflecting mirror surface 22. Image multiplier grid 25 is located in incident optical alignment with lens system 24, resultant images from image multiplier grid 25, as shown by dotted lines, strike mirror 28 which is aligned with image multiplier grid 25 so as to receive said images and film 29 is so located as to receive the reflections from mirror 28.

FIG. 2 represents a side view of the apparatus for producing multiple images in combination with the image multiplier grid. Two mirror surfaces 27a and 27b are shown in the bottom view of image multiplier grid 25. The mirror surface 27b is shown offset from mirror surface 27a as a representation that the mirror surface is advanced through a small angle ahead of mirror surface 27a.

FIG. 3 is an enlarged view of the rotating mirror of FIGS. 1 and 2 showing its structural details. In this embodiment rotating mirror 30 has five sides blackened with flat reflecting mirror surface 18 and flat reflecting mirror surface 22 located on two sides of rotating mirror 30, and located between flat reflecting mirror surfaces 18 and 22 are spherical mirror surfaces 20a and 20b. These are capable of receiving two light beams and are formed in a concavely curved manner so as to provide the greatest possible light gathering power. Flat reflecting mirror surfaces 18 and 22 consist of optically flat mirror surfaces ground and polished prior to assembly and adhesively bonded to the mirror block 30 preferably in the manner disclosed in Bohn et al. Patent No. 3,040,627. The spherical mirror surfaces 20a and 20b are preferably prepared and bonded in the same manner as flat reflecting mirror surfaces 18 and 22, the only difference being in the nature of the preparation of the surface to produce a spherical reflecting surface rather than optically flat ones.

FIG. 4 shows one preferred embodiment of the image multiplier grid. Image multiplier grid blocks 61 and 62 are located on mirror post 60, a slot recess 63 in the rear of blocks 61 and 62 communicates with a recess 64 for mounting said blocks on mirror post 60, said slot recess being traversed by adjusting screws 71 and 72 which are inserted in threaded recesses in the blocks in such a manner that they may be turned to secure blocks 61 and 62 on mirror post 60 in any predetermined position. Mirror post 60 is attached to mirror stand bracket 65 containing an elongated recess 66 for providing adjustable anchorage within the high speed camera.

FIG. 5 illustrates the detailed cross-section taken at lines V—V of reflecting grid surfaces 27a and 27b of grid blocks 61 and 62 (FIG. 4) respectively. This cross-section shows that each of the five mirror surfaces at b, c, d, e and f of the grid block 61 of FIG. 4 describes an angle slightly greater than the corresponding mirror surface of grid block 62, each succeeding mirror surface on each grid block 61 and 62 being inclined to each preceding mirror. As an example, the angles between mirrors of the same set may be 1½ degrees. FIG. 5 also represents how the corresponding mirror surfaces of the upper grid block 61 (shown with cross-sectional marks) while in the same inclined relationship to each other as are g, h, i, j and k of lower grid block 62 are located in different vertical planes. In the preferred embodiment of this invention, reflecting surfaces g, h, i, j and k are each inclined ¾ of a degree in the vertical planes to the reflecting mirror surfaces of b, c, d, e and f.

FIG. 6 is a pictorial representation of a typical sequence of pictures taken when utilizing the image multiplier grid. The high-speed phenomenon being photographed was that of an exploding electrically charged wire. The ten pictures show the absence of any time smear characteristic; the proper time sequence is observed by following exposure numbers 1–10 in order. This illustration shows the result of the inclined angular relationships of the grid block reflecting surfaces shown in FIGS. 4 and 5.

The angular relationship between the blocks may be achieved simply by adjustably moving one block with respect to the other, the mirror surfaces in each block being preset. In this manner it is possible to adjust the time lapse interval between the upper and lower pictures if it is so desired.

The apparatus of the present invention has produced photographs with exposure times of about ¼ of a microsecond with a time lapse of approximately ½ of a microsecond between successive pictures. This camera is able to take twice as many pictures of a given phenomenon in a much smaller time interval as the high speed camera of Nadig et al. Patent No. 2,961,918 issued November 28, 1960. When the high speed camera is in operation the grid reflecting surfaces are positioned in incident relation to the optical axis of the multiple image rotating mirror system, so that the light from each beam of said system is capable of being reflected to each grid mirror surface and from the same, in a predetermined timed relationship to a recording means.

The grid mirrors are horizontally aligned in rows corresponding to the number of image beams in the multiple image system and the mirrors are so inclined to one another in a row and each row is in a predetermined vertical relationship to the other rows such that the reflected images from these rows record from top to bottom on a recording means such as photographic plate pictures of the phenomena being observed.

In addition to the benefits derived from the image multiplier grid, the rotating reflector, as heretofore described, contains spherical recessed reflecting portions corresponding to the number of beams of light in the system and is so located that the point of convergence of said beam occurs at the center of each of the spherical recesses when the light is reflected from one flat reflecting surface to the adjacent mirror and into the spherical mirror surface. The spherical mirror surface has been found superior to the previously used reflecting surfaces in that it exhibits a high degree of light gathering power, thus eliminating the light intensity problems of the prior art, and thereby assuring good film exposure and uniform pictures of the phenomena being observed.

In operation, then, light from the object 12 to be photographed is split by beam splitting prism 14 and then focused by lens system 15, and apertured by slit plate 16 such that the resultant converging beam falls on flat reflecting mirror surface 18. From this point it is reflected to adjacent angularly arranged mirror surface 19 and then onto each spherical mirror surface 20. Point 21 designates the point of convergence of this beam and as the beam leaves spherical mirror surface 20 it is in a diverging condition. It is thereupon reflected to angularly arranged mirror surface 19b and then back onto flat reflecting mirror surface 22 of rotating mirror 30, and then onto lens system 24. Lens system 24 then focuses the beam onto a mirror of the image multiplier grid 25. During the travel of the light beam through the system, rotating mirror 30 is being revolved at high speed. This imparts an angular velocity to the light beam impinging on lens system 24 and subsequently imparts angular velocity to the resulting beam from lens system 24. Observing in detail, FIG. 5, the construction of the image multiplier grid, the converging light beam with its rotational velocity will strike mirror surfaces b, c, d, e and f in a predetermined timed relationship. The phenomena will be occurring in the second beam of the system, which beam will strike mirror surfaces g through k immediately after the previous image had been reflected by its lettered counterpart b through f, but before the light beam has been reflected from c. In this manner the images produced will be derived divergingly from the mirrors in this order b, g, c, h, d, i and so forth, corresponding to pictures 1, 2, 3, 4, 5, 6 and so forth of FIG. 6.

Although this invention has been described with reference to a particular embodiment, it will be understood by one skilled in the art that the invention is capable of a variety of alternative embodiments within the spirit and scope of the appended claims.

The following is claimed:

1. A high speed camera comprising
   a prismatic image splitter
   at least one objective lens arranged along the optical axis of each image resulting from the image splitter,
   at least one aperture adjacent each objective lens in alignment with the optical axis of the image passing through the objective lens,
   a rotating reflector system comprising a rotating reflector containing at least three adjacent reflecting surfaces and arranged with respect to the optical axes of the images to present a first reflecting surface incident to the images transmitted from the apertures, the rotating reflector is further provided with at least two complementary reflectors for transmitting images successively and simultaneously from the first reflecting surface to the successive adjacent reflecting surface in the direction of rotation, the first adjacent surface being shaped for preserving the intensity of the images received by it, and the resultant images transmitted from the rotating reflector characterized by having an angular velocity due to the rotation of the reflector,
   an image multiplier located in at least a portion of the path of the moving images, the multiplier comprising a plurality of mounting elements, each containing at least one mounting surface located incident to the path of the images and having attached edgewide thereon a plurality of adjacent reflectors such that each reflector will receive and reflect individual substantially stationary images, and
   recording means for receiving and recording the stationary virtual images in order to preserve them in an observable state.

2. The apparatus defined in claim 1 wherein the image multiplier mounting surfaces contain thereon a plurality of narrow mirrors arranged side by side at small angles to one another.

3. The apparatus defined in claim 2 wherein the rotating reflector is an octagonal member having five sides blackened and three adjacent sides containing flat reflecting surfaces.

4. The apparatus defined in claim 3 wherein the rotating reflector is an octagonal member having five sides blackened, two optically flat reflecting surfaces, and containing a depressed reflecting surface with spherical shaped recesses located between the flat reflecting surfacs and in alignment with the images transmitted to it.

5. The apparatus defined in claim 4 wherein the image multiplier comprises two superposed mounting elements with the reflectors on the face of one element offset from the reflectors of the other element by an angle of three-fourths of a degree when adjacent reflectors on each element form an angle with one another of one and one-half degrees.

6. A high speed camera comprising a multiple image system and an image multiplier grid, the multiple image system comprising means for forming more than one channel for receiving electro-magnetic radiation from an object to be observed, a polygonal rotating member placed in the path of the channels having a plurality of reflecting surfaces thereon for receiving radiation from the object, a plurality of reflectors oppositely inclined to at least two of the reflecting surfaces on the rotating member so as to increase the number of reflections from the rotating member, at least one first reflector in each channel positioned incident to the image first reflected from the rotating reflector and adapted to transmit the image to another reflecting surface on the rotating reflector; at least one second reflector positioned to receive images from the rotating reflector which has been transmitted to it from the first reflector and capable of reflecting the image to another reflecting surface on the rotating reflector; an image multiplier grid comprising at least one adjustably movable mounting block containing at least one face thereon incident to the images received from the rotating reflector and having attached thereon a plurality of reflectors positioned with respect to each other in a uniform fixed angular relationship and in alignment with the images reflected from the rotating member, so that an image from the rotating reflector which is moving with an angular velocity will strike one reflector and then other reflectors successively as the rotating reflector rotates, and means for recording without time-smear, the images viewed and transmitted by the multiple image system and separated by the image multiplier grid.

7. The high speed camera as defined in claim 6 wherein said polygonal rotating member is an octagon with five adjacent sides blackened, two sides having flat reflecting surfaces, and located between and adjacent said flat reflecting surfaces a recessed reflecting surface having a plurality of spherically shaped recesses corresponding in number to and located incident to the images projected in said camera.

References Cited by the Examiner
UNITED STATES PATENTS

| 1,796,420 | 3/1931 | Adsit | 178—6 |
| 2,400,887 | 5/1946 | Miller | 352—84 |
| 2,618,195 | 11/1952 | Herman | 352—39 |
| 2,687,062 | 8/1954 | Baird | 352—84 |
| 3,012,470 | 12/1961 | Bohn et al. | 352—57 |

FOREIGN PATENTS

| 550,665 | 11/1930 | Germany. |
| 472,013 | 9/1937 | Great Britain. |

JULIA E. COINER, *Primary Examiner.*